UNITED STATES PATENT OFFICE.

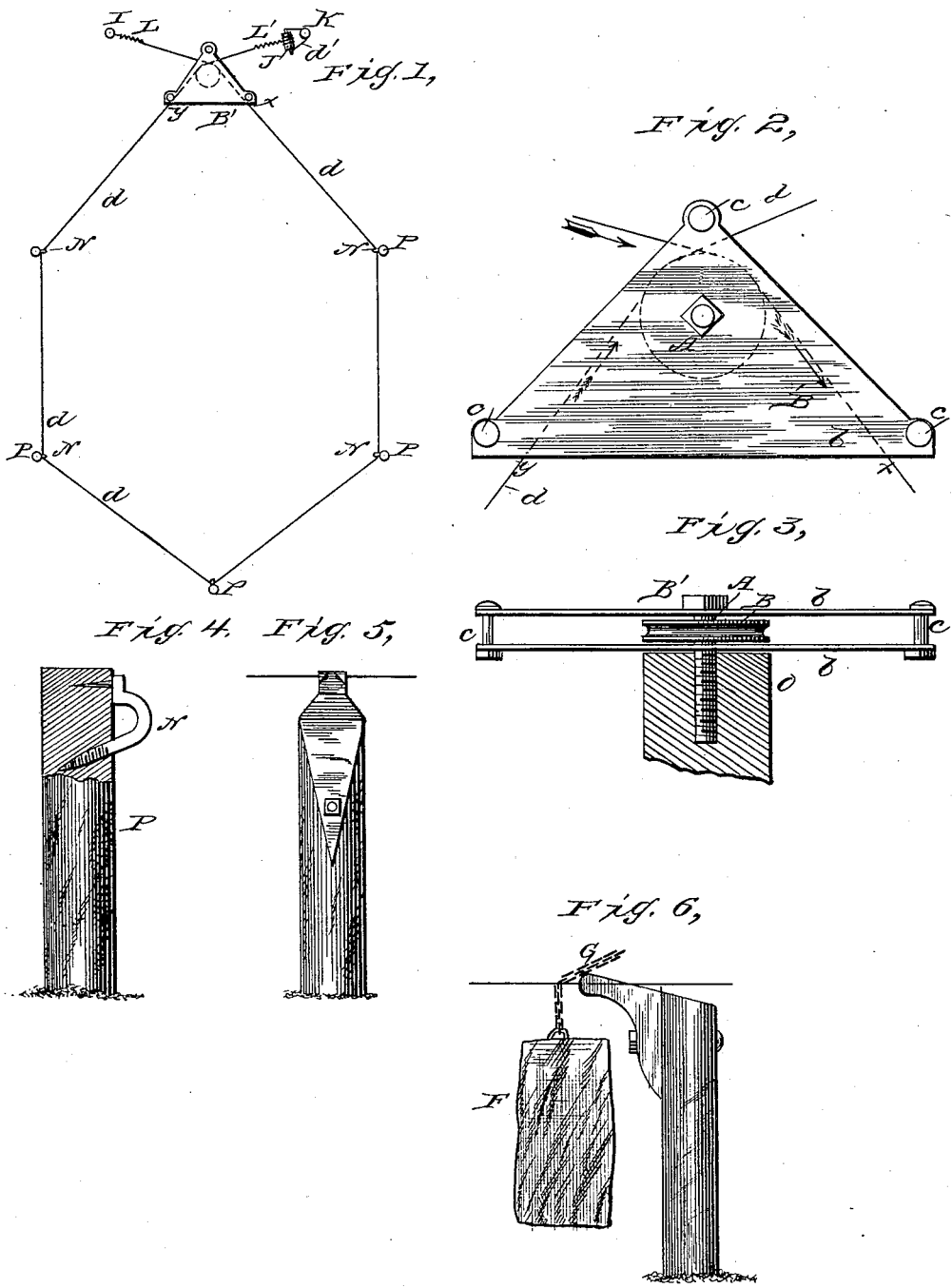

JOHN D. WILSON, OF GREENLEAF, KANSAS.

TETHER-HOLDER.

SPECIFICATION forming part of Letters Patent No. 262,525, dated August 8, 1882.

Application filed June 17, 1882. (No model.)

*To all whom it may concern:*

Be it known that I, JOHN D. WILSON, of Greenleaf, in the county of Washington and State of Kansas, have invented certain new and useful Improvements in Tether-Holders; and I do hereby declare that the following is a full, clear, and exact description of the invention, which will enable others skilled in the art to which it appertains to make and use the same, reference being had to the accompanying drawings, which form a part of this specification, and in which—

Figure 1 is a diagram illustrating the application of my device. Fig. 2 is an enlarged detail view of the pulley-frame, which is secured in a horizontal position on the top of one of the corner-stakes of the inclosure, and its adjuncts. Fig. 3 is a side elevation of the said pulley-frame and pulley. Figs. 4 and 5 are detail views of the posts which support the inclosing wire; and Fig. 6 is a detail view of the anchor or hopple which is attached to the animal to be tethered.

Similar letters of reference indicate corresponding parts in all the figures.

My invention has relation to devices for securing domestic animals within certain limits, while at the same time allowing them to feed freely within the said limits; and it consists in the construction and arrangement of an inclosing wire adapted to engage with a suitably-constructed hopple or anchor which is connected to the animal, substantially as hereinafter more fully described.

In the accompanying drawings, the letter B′ represents a triangular frame, made of plates $b$ $b$, which are connected at the corners, a suitable distance apart, by bolts $c$. Within this frame is placed a sheave or pulley, B, which revolves upon a bolt, A, inserted through the pulley-frame B′ into the corner-post O, and thus, it will be seen, holding the frame in a horizontal position on top of the post.

A wire, $d$, has a spring, L, at one end, and is fastened at that end to a suitably-located stake, I. From this stake the wire is inserted through the pulley-frame, as indicated by the arrows in Fig. 2, bearing against the pulley, and passing out of the triangular frame at the corner marked $x$. The free end of the wire is then inserted successively through loops or staples N of the supporting-posts P, which are driven into the ground at suitable distances apart, and rise from six inches to two feet and a half, or more, out of the ground, according to the size of the animal to be placed within the inclosure. A suitable space having been inclosed by the wire $d$, its free end is brought back to the corner-post O and inserted through the pulley-frame B′ at the corner marked $y$, bearing against the pulley, as shown in Fig. 2, and passing out of the frame, where it is connected to a spring, L′, the other end of which is connected by a wire, $d'$, to the windlass J, which is suitably fastened to an inclined stake, K. By turning the windlass J (which should be provided with a pawl-and-ratchet mechanism or other suitable means for fixing it in any given position) the inclosing wire $d$ may be drawn taut through its successive series of supports, while at the same time the springs L and L′ permit it to give or yield without breaking if the animal steps upon it or otherwise comes in sudden and forcible contact with it.

The hopple F is attached by a flexible connection, G, to the head or one of the feet of the animal to be tethered, and should the animal pass over the inclosing wire will catch upon this, and thus stop him. After a few attempts, however, the animal will not pass over the wire, but will remain quietly within its limits.

Having thus described my invention, I claim and desire to secure by Letters Patent of the United States—

The inclosing wire $d$, having the springs L and L′ at opposite ends, and attached at one end to the fixed stake I and at the other to the windlass J, in combination with the triangular pulley-frame B′, secured horizontally on the top of corner-post O, and having the pulley B and suitably-arranged stakes or wire-supports P, arranged substantially as described, and for the purpose set forth.

In testimony that I claim the foregoing as my own I have hereunto affixed my signature in presence of two witnesses.

JOHN D. WILSON.

Witnesses:
W. P. MUDGETT,
CHAS. BARRETT.